United States Patent [19]

Hashimoto et al.

[11] Patent Number: 5,513,485
[45] Date of Patent: May 7, 1996

[54] FULL-SWINGING CUTTER FOR REDUCTION HEAD

[75] Inventors: Tom T. Hashimoto, Conroe; William S. O'Hagan, Sr., New Waverly; John P. O'Hagan, Conroe, all of Tex.

[73] Assignee: Joan M. O'Hagan, Conroe, Tex.

[21] Appl. No.: 306,937

[22] Filed: Sep. 16, 1994

[51] Int. Cl.⁶ ............................ A01D 34/52; A01G 23/08
[52] U.S. Cl. .................... 56/294; 56/10.1; 144/34 R; 144/3 D; 144/335; 144/336; 144/218; 241/194; 241/101.77
[58] Field of Search .................... 56/10.1, 233, 234; 241/101.77, 101.71, 101.74, 194, 291, 292.1; 144/3 D, 34 R, 335, 336, 241, 218

[56] References Cited

U.S. PATENT DOCUMENTS

| | | | |
|---|---|---|---|
| 2,602,597 | 7/1952 | Ball | 241/194 X |
| 2,755,829 | 7/1956 | Streed et al. | 56/29 X |
| 3,261,151 | 7/1966 | Breed et al. | 56/294 |
| 3,375,647 | 4/1968 | Mott, Jr. | 56/294 |
| 3,422,611 | 1/1969 | Barows | 56/294 |
| 3,465,507 | 9/1969 | Fishaw | 56/294 |
| 4,000,859 | 1/1977 | Whitney | 241/194 |
| 5,378,852 | 1/1995 | Manor | 144/34 R |

FOREIGN PATENT DOCUMENTS 846117  8/1960  United Kingdom ................. 56/29

*Primary Examiner*—W. Donald Bray
*Attorney, Agent, or Firm*—Bush, Moseley, Riddle & Jackson

[57] ABSTRACT

A free-swinging cutter element for a timber thinning machine includes a generally stirrup-shaped member having an outer wall and integral side walls. Each half of the member is formed as the frustrum of a triangle so that bevels on the upper and lower surfaces form sharp cutting edges that incline to respective upper and lower points in the center of the outer wall. This construction moves the center of mass further outward toward the outer wall to increase chipping and cutting efficiency, which is further increased by the form of the cutting edges. A single edged cutter having similar overall shape also is provided.

7 Claims, 1 Drawing Sheet

U.S. Patent    May 7, 1996    5,513,485
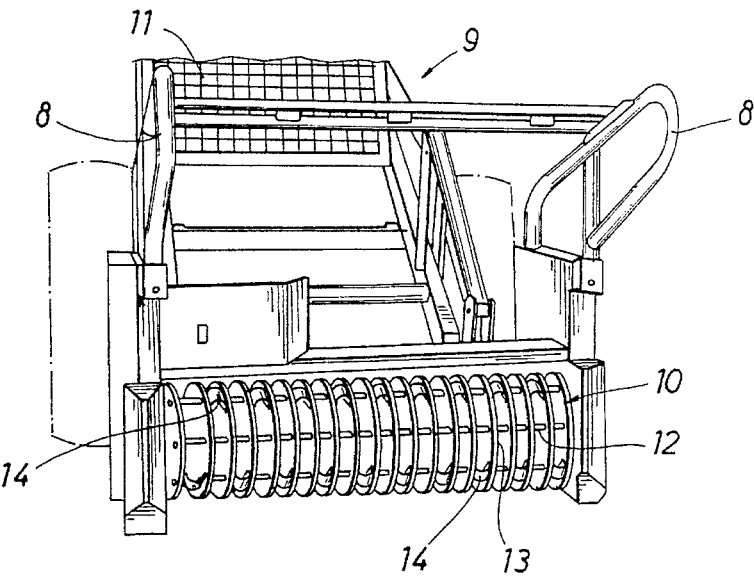
FIG. 1
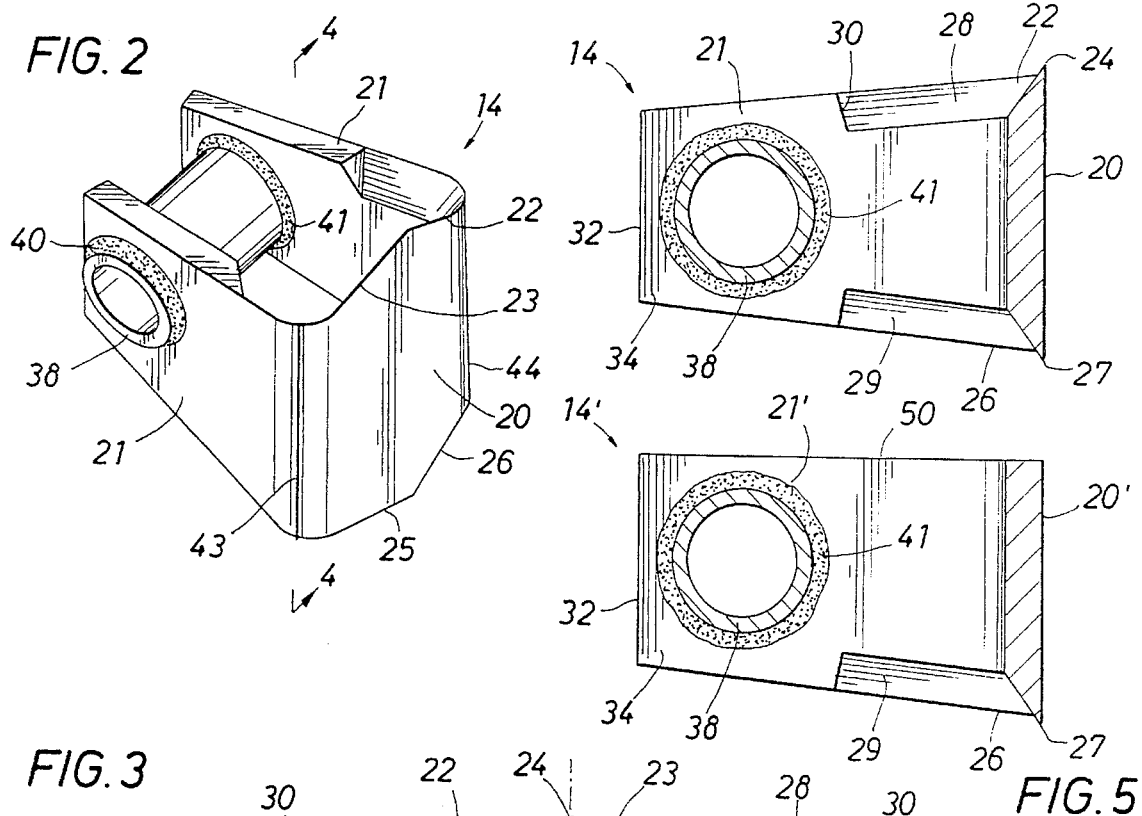
FIG. 2
FIG. 4
FIG. 3
FIG. 5
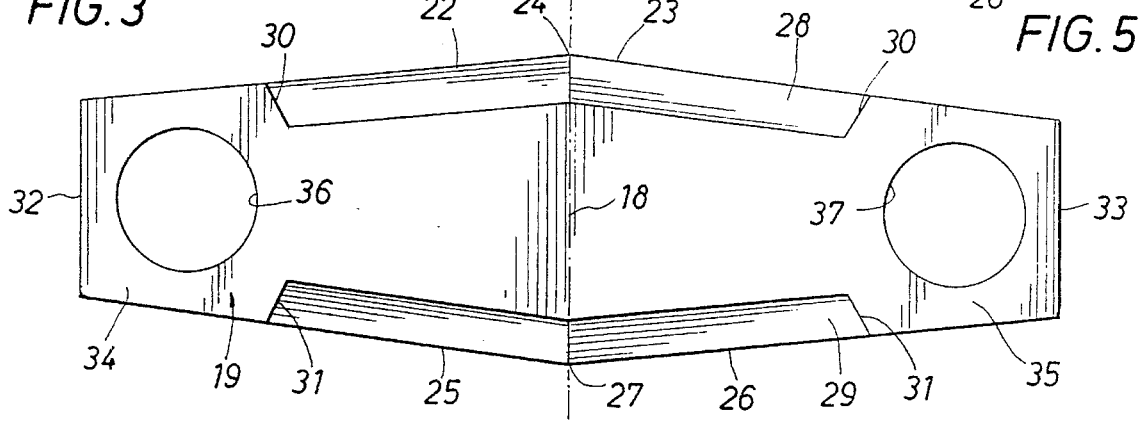

FULL-SWINGING CUTTER FOR REDUCTION HEAD

FIELD OF THE INVENTION

This invention relates generally to cutter blades used in timber thinning machinery, and particularly to a new and improved flail-type free-swinging blade having a particular configuration and cutting edge design that enhances cutting efficiency on impact with a wooden object such as a small tree, brush or logging slash.

BACKGROUND OF THE INVENTION

It is often desirable to thin a timbered area by felling younger and smaller trees, for example those having up to a 6 inch diameter trunk, or by removing underbrush or logging slash or any other undesirable forest residue or vegetation. Typically the wood should be broken up into small pieces or chips to foster rapid decomposition and to minimize fire danger. Although a number of different types of machines have been used for this purpose, one having a reduction head mounted on a horizontal shaft with rows of swinging blades appears to be advantageous because it is capable of cutting closer to the ground, and is safer in that it has less tendency to throw cut material in all directions. Moreover, the reduction head is closely coupled to the vehicle to provide good operator visibility.

A typical machine of this type has a drum or reel that includes a plurality of angularly spaced transverse shafts or bars on its outer periphery. Each shaft mounts a number of free-swinging, U-shaped cutter elements that are spaced apart and have sharpened cutting edges on the lower side thereof. The reel is mounted on the front of a wheeled or tracked vehicle and is rotated at high speed by a hydraulic motor. Each cutter element blade strikes the target and then is pushed back somewhat, but then swings forward to the correct position for the next impact during the next revolution of the reel. So long as the blades on the cutter elements remain sharp, the small trees, brush or slash is reduced to small chips in short order.

One inefficiency in prior cutter designs is that the location of its center of mass with respect to its center of rotation has not been optimized to give the best impact force on each revolution. This reduces cutting efficiency, and increases vibration. Another shortcoming of prior cutter design lies in the shape of the cutting edge. Prior edges have been straight, which reduces the penetration of the blade into the wood on each impact, and thus increases the time required to cut through a given thickness. These cutters also wear out rather rapidly and cannot be resharpened because the worn metal face is well above to bottom surfaces of the sides thereof which block engagement of a resharpened edge on the front.

An object of the present invention is to provide a new and improved cutter blade for a rotating reduction head that obviates the foregoing disadvantage of prior devices.

Another object of the present invention is to provide a new and improved free-swinging cutter for a rotating reduction head that is designed to have greater impact force on each engagement with the wood.

Another object of the present invention is to provide a new and improved cutter of the type described having its cutting edge shaped and arranged to obtain greater penetration on each impact.

Yet another object of the present invention is to provide a new and improved cutter of the type described having a substantially increased wear life compared to prior devices.

SUMMARY OF THE INVENTION

These as well as other objects are attained in accordance with the concepts of the present invention through the provision of a free-swinging cutter blade for a rotating reduction head, such blade being generally U or stirrup-shaped and having an outer wall and opposite side walls. Considering the blade as being a flat plate, the halves thereof are shaped as the frustrum of triangles having a common base line at the center of the plate and tapering outward to minimum end dimensions. A transverse hole is formed through each side adjacent its outer end wall, and the opposite side walls of the plate are beveled top and bottom over most of their length to provide sharp edges that are inclined to form pointed teeth at each end of the common base line. When the plate is bent or curved into a generally stirrup-shaped member, the holes are aligned to receive a mounting tube by which the cutter is rotatably mounted on a bar of the reduction head. Preferably the tube is welded to the side walls so as to become an integral part thereof. The outer end surfaces of the tube project beyond the respective side walls to provide bearing surfaces. The shapes of the sides and front walls is such that the center of the mass of the cutter is moved outward compared to prior devices, whereby the cutter strikes with greater impact. Each pointed tooth on the front wall of the cutter member has greater shearing action and penetration into the wood on each impact. Thus the cutter of the present invention works with greater efficiency than prior devices and provides reduced cutting time. When one cutting edge becomes worn or damaged in use, the member can be dismounted and turned over so that the opposite cutting edge faces downward. Since the respective pointed teeth are formed at the intersections of upper and lower inclined sharp edges, considerably more metal has to be worn away before the cutter element must be discarded.

BRIEF DESCRIPTION OF THE DRAWINGS

The present invention has the above as well as other objects, and advantages which will become more clearly apparent in connection with the following detailed description of preferred embodiments, taken in conjunction with the appended drawings in which:

FIG. 1 is a schematic front view of a machine having a rotating reduction head with cutters mounted thereon;

FIG. 2 is an isometric view of a cutter of the present invention;

FIG. 3 is a developed plan view of the cutter prior to being bent into the shape shown in FIG. 2;

FIG. 4 is a cross-section on line 4—4 of FIG. 2; and

FIG. 5 is a view similar to FIG. 4 except showing a cutter element having a single cutting edge.

DETAILED DESCRIPTION OF PREFERRED EMBODIMENTS

Referring initially to FIG. 1, numeral 10 indicates the rotating reduction head of a timber stand thinning machine. The head 10 is mounted on the front of a vehicle 9 and can be raised and lowered as desired through operation of various hydraulic cylinders and controls. The head 10 is driven in rotation about a horizontal axis by means such as a hydraulic motor (not shown) that is supplied with fluid under pressure by a pump on the vehicle 9. The vehicle 9 can be tracked or wheeled, and typically has a brush bar shield 8 and a screen 11 for the safety of the driver. The reduction head 10 can take the form of an elongate drum having a central shaft (not shown) and a plurality of transverse, angularly spaced rods or bars 12 on or near its outer periphery. The bars 12 extend through laterally spaced circular partitions 13 which provide rigidity. On every other rod 12 and between alternating pairs of the plates 13 is a free swinging cutter 14 that is constructed in accordance with the present invention. As shown, the next row of cutters 14 on a rod 12 is staggered relative to the previous row so that the full width of a wooden object is struck by a cutter 14 during each revolution of the drum. Although two rows of cutters 14 that are 180° apart are shown, other arrangements such as four rows at 90° could be used. As the reduction head 10 rotates counterclockwise as viewed from the left side, the cutters 14 repeatedly come around and strike the target, whether it be a tree, brush or log or the like. In short order the wood will be reduced to small chips which can rapidly rot on the ground.

As shown in FIG. 2 each cutter member 14 is a generally U or stirrup-shaped device having an outer wall 20 and opposite side walls 21. The cutter 14 can be formed and machined as a flat plate 19 as shown in FIG. 3, and then be bent into the configuration shown in FIG. 2. The cutter 14 can be double or single edged in accordance with the invention, however a double edged device may be preferred. A double edged embodiment can have its orientation reversed after one of the edges is damaged or sufficiently worn. A cutter 14 having a single edge is somewhat less expensive to make, and when excessively worn or damaged is removed for sharpening or replaced with a new one. Of course in either embodiment the cutter can be sharpened in-situ. The plate 19 has an overall shape which may be considered as being formed by oppositely extending, truncated triangles having a common base line indicated by dash-dot-dash line 18 in FIG. 3. The plate 19 has upper sharp edges 22, 23 that incline upward to a centrally located point 24, and lower sharp edges 25, 26 which incline downward to a point 27. The sharp edges are provided by oppositely inclined bevels 28, 29 which extend from intersections at the points 24, 27 to locations 30, 31 that are spaced from the end walls 32, 33 of the plate 19. The angle of bevels 28, 29 can be about 45° with respect to the outer wall surfaces of the cutter member 14.

The outer portions 34, 35 of the side walls 21 have apertures 36, 37 which receive the end portions of a tube 38 (FIG. 2) by which the cutter element 14 is swingably mounted on a transverse rod 12 of the reduction head 10. After being formed as shown in FIG. 3, the plate 19 is bent into the generally stirrup-shaped configuration shown in FIG. 2 where each side wall 21 extends rearward at an acute angle of about 75° to the front wall 20. The tube 38 is positioned through the apertures 36, 37 and preferably is welded at 40 and 41. As shown in FIG. 2, the tube 38 is long enough that its outer end surfaces extend slightly beyond the outer side surfaces 43, 44 of the front wall 20 to provide bearing surfaces which allow free swinging movement of the cutter 14 by bearing against the partitions 13 of the reduction head 10 while preventing engagement of any other cutter side wall surface therewith.

FIG. 4 illustrates an embodiment of the present invention which is double-edged by having a lower central tooth 27 at the intersection of lower edges 25, 26 and an upper central tooth 24 at the intersection of upper edges 22, 23 when the tooth 27 and edges 26 become sufficiently worn in use. The cutter element 14 can be removed and turned over so that the tooth 24 faces downward. FIG. 5 shows another embodiment of the invention where the cutter element 14' is single-edged and has only one tooth 27 at the intersection of lower sharp edges 25, 26. The upper surface 50 of each side wall 21' can be formed to extend at a right angle to its rear wall surface 32, and the upper bevels 28 are omitted so that there is no sharp upper edge or tooth. When the lower edge 26 and the tooth 27 are worn away such that cutting ability is highly impaired, the cutter element 14' is simply replaced with a new or reconditioned element.

OPERATION

In operation, a plurality of the cutters 14 in accordance with the present invention are swingably mounted on the bars 12 between alternating pairs of the plate members 13 of the reduction head 10. The next successive bar 12 on which cutters 14 are mounted has them mounted between the previous cutters for full coverage during a rotation of the header 10. As the head 10 is brought up to a selected rotational speed, centrifugal force causes each cutter elements 14 to extend radially outward. The vehicle 9 then is driven into the timber, brush or slash to be cut. As noted above, the head 10 is rotated in a direction such that the front cutters are moving downward so that chips of wood are thrown against the ground. As each cutter 14 strikes a target, the cutting edges 25, 26 bite into the wood and may cut through it altogether if the wood is soft enough and its thickness is small enough. Otherwise the cutter 14 bites in as far as it can and then is pushed back to remove a chip of the wood. As the cutter revolves, centrifugal force causes it to regain a radial position before it again impacts the wood. The process continues until the wood has been reduced to small chips. When the target is a small diameter tree, say one with up to a 6 inch diameter trunk, the trunk will be cut through and the tree will fall or be pushed forward, after which the head 10 is driven over it to reduce the stump, the remaining trunk and the branches. Small underbrush and general vegetation are reduced to chips or debris immediately.

The formation of each half of the plate 19 as the frustrum of a triangle as shown in FIG. 3 places the center of the mass of the stirrup-shaped cutter 14 further outward with respect to the axial centerline of the tube 38 than would be the case if the plate is rectangular. This feature increases the impact by which the cutter 14 engages the wood, and provides increased cutting efficiency. Cutting efficiency is further enhanced by the inclined shape of the cutting edges leading to the central points 24, 27. This shape enables an edge to progressively sever the wood fibers on each impact, which gives a greater depth of penetration on each impact. This feature also increases the cutting efficiency since more wood is chipped out at each impact. Moreover, there is considerably more metal that must be worn away before the cutter must be reversed or discarded. In fact the wear life of the present invention is increased by at least a factor of two compared to prior devices.

Applicant has found that best results can be obtained when the metal from which the cutter 14 is made is a high carbon or low alloy steel having a yield strength of about 140 Ksi, which has been heat treated to have a minimum Brinell hardness of about 450. When sufficient wear has taken place, or when damage due to striking rocks or the like have occurred, a cutter 14 can be dismounted and turned over so that the opposite sharp edges are used. In the event the single-edged cutter 14' is used, it can be replaced with a new or reconditioned element, or re-sharpened in-situ.

It now will be recognized that a new and improved high speed cutter element for a rotating timber reduction head which provides more efficient and longer lasting cutting or chipping action has been disclosed. Since certain changes or modifications may be made in the disclosed embodiment without departing from the inventive concepts involved, it is the aim of the appended claims to cover all such changes and modifications falling within the true spirit and scope of the present invention.

What is claimed is:

1. A free-swinging cutter for use on the reduction head of a timber-thinning machine that is adapted to cut up small trees, brush, and slash or the like, comprising: a generally stirrup-shaped member having an outer wall and rearwardly extending side walls, said member having a progressively diminishing height from the center of said outer wall to the rear portions of said side walls; means for mounting said member on the reduction head for rotation about an axis; and bevel means forming inclined cutting edges on said outer wall and a portion of each of said side walls, said cutting edges extending to a point of intersection at the center of said outer wall.

2. The cutter of claim 1 wherein each of said side walls and a portion of said front wall are formed as the frustrum of a triangle having a lesser vertical dimension at the rear of said side walls to thereby move the center of mass of said cutter element outward with respect to said axis.

3. The cutter of claim 2 wherein said mounting means comprises aligned openings in said side walls, and a tube having opposite end portions extending through said aligned openings, said tube having a length dimension that is greater than the width dimension of said front wall.

4. A free-swinging cutter for use on the reduction head of a machine that is adapted to cut up small trees, brush, slash or the like, comprising: a cutter member initially formed as a flat metal plate having oppositely extending portions each formed as the frustrum of a triangle with its base line at the center of said plate; bevel means along upper and lower portions of said plate forming sharp cutting edges, said cutting edges intersecting at a point on said base line; and an aperture through each of said opposite end portions adjacent the outer end wall thereof, said plate being adapted to be bent into a generally stirrup shape with said bevel means on the inside of said stirrup and with said apertures aligned; and a tube having end portions extending through said apertures and joined to said sides.

5. The cutter of claim 4 wherein each of said sides forms an angle less than 90° with the outer wall of said cutter.

6. The cutter of claim 5 wherein the ends of said tube extend beyond the respective opposite sides of said outer wall to provide bearing surfaces during rotation.

7. The cutter of claim 6 wherein said cutter is made of a low alloy steel that is heat treated to have a Brinell hardness of about 450.

* * * * *